United States Patent
Iida

(10) Patent No.: US 10,425,581 B2
(45) Date of Patent: Sep. 24, 2019

(54) RECORDING APPARATUS, CONTROL METHOD OF RECORDING APPARATUS, AND STORAGE MEDIUM

(71) Applicant: CANON KABUSHIKI KAISHA, Tokyo (JP)

(72) Inventor: Kiyoshi Iida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/589,529

(22) Filed: May 8, 2017

(65) Prior Publication Data
US 2017/0332015 A1 Nov. 16, 2017

(30) Foreign Application Priority Data
May 12, 2016 (JP) .................. 2016-096259

(51) Int. Cl.
*H04N 5/232* (2006.01)
*G01S 19/14* (2010.01)
*H04N 5/92* (2006.01)
*H04N 5/77* (2006.01)
*H04N 5/907* (2006.01)
*H04N 9/82* (2006.01)
*H04L 29/08* (2006.01)

(52) U.S. Cl.
CPC ......... *H04N 5/23241* (2013.01); *G01S 19/14* (2013.01); *H04N 5/772* (2013.01); *H04N 5/907* (2013.01); *H04N 5/9201* (2013.01); *H04N 9/8205* (2013.01); *H04L 67/18* (2013.01)

(58) Field of Classification Search
None
See application file for complete search history.

(56) References Cited

U.S. PATENT DOCUMENTS

| | | | | |
|---|---|---|---|---|
| 2012/0200715 | A1* | 8/2012 | Takahashi | H04N 5/232 348/169 |
| 2012/0200717 | A1* | 8/2012 | Suzuki | H04N 1/32106 348/207.1 |
| 2014/0032551 | A1* | 1/2014 | Matsuda | G06F 17/30722 707/736 |
| 2014/0063291 | A1* | 3/2014 | Ohshima | H04N 5/232 348/231.99 |

FOREIGN PATENT DOCUMENTS

JP 2012105014 A 5/2012

* cited by examiner

Primary Examiner — James M Hannett
(74) Attorney, Agent, or Firm — Canon U.S.A., Inc. IP Division

(57) ABSTRACT

A recording apparatus with a battery attachable to and detachable from, includes a positioning unit configured to determine position information based on signals received from satellites, a retaining unit configured to retain the position information determined by the positioning unit, and a control unit, wherein the control unit determines whether latest position information is valid based on an acquisition time of the latest position information from among pieces of the position information retained by the retaining unit and a current time, and uses position information determined as valid as current position information, and wherein the control unit determines whether the latest position information is valid in response to the battery being attached.

16 Claims, 8 Drawing Sheets

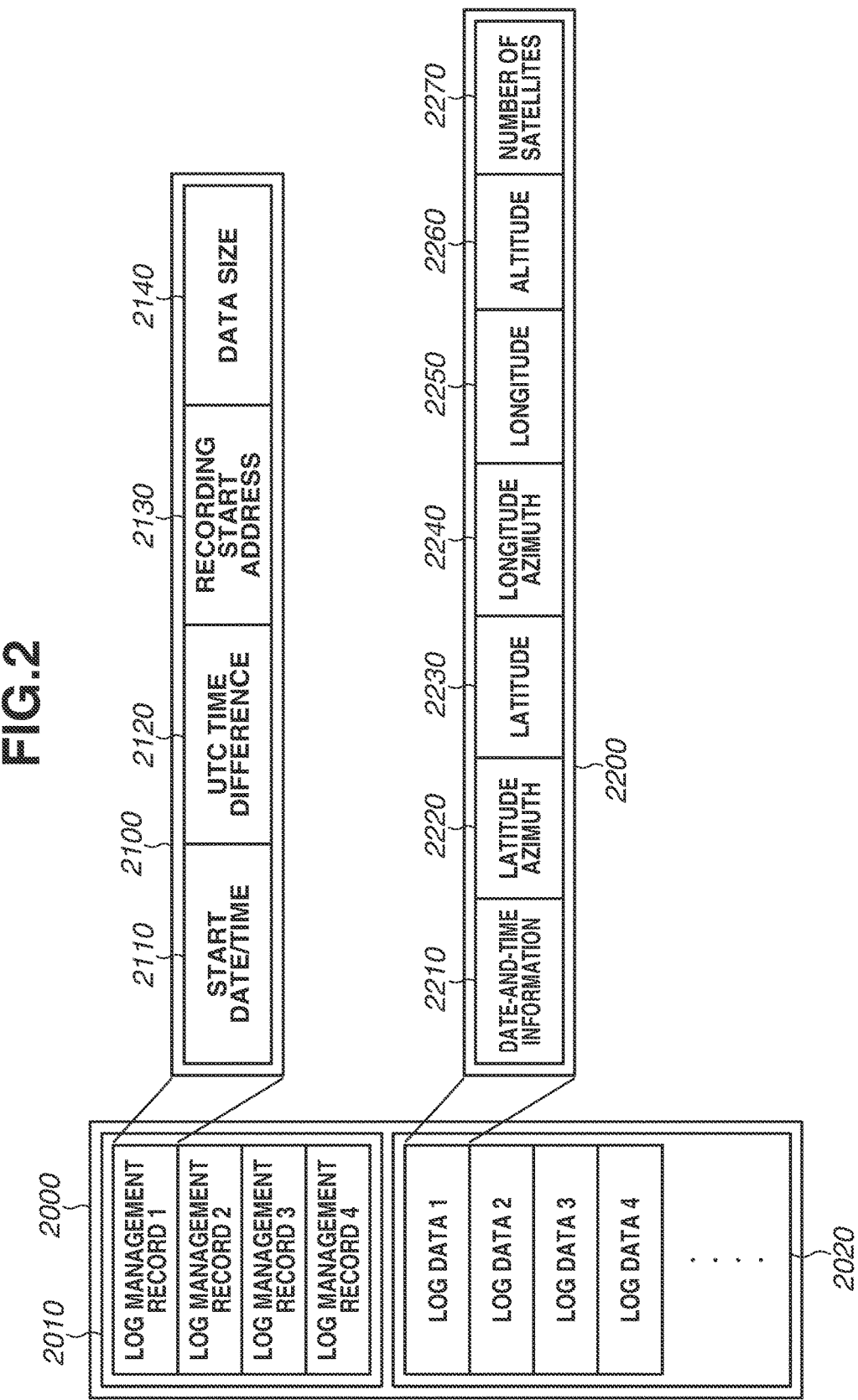

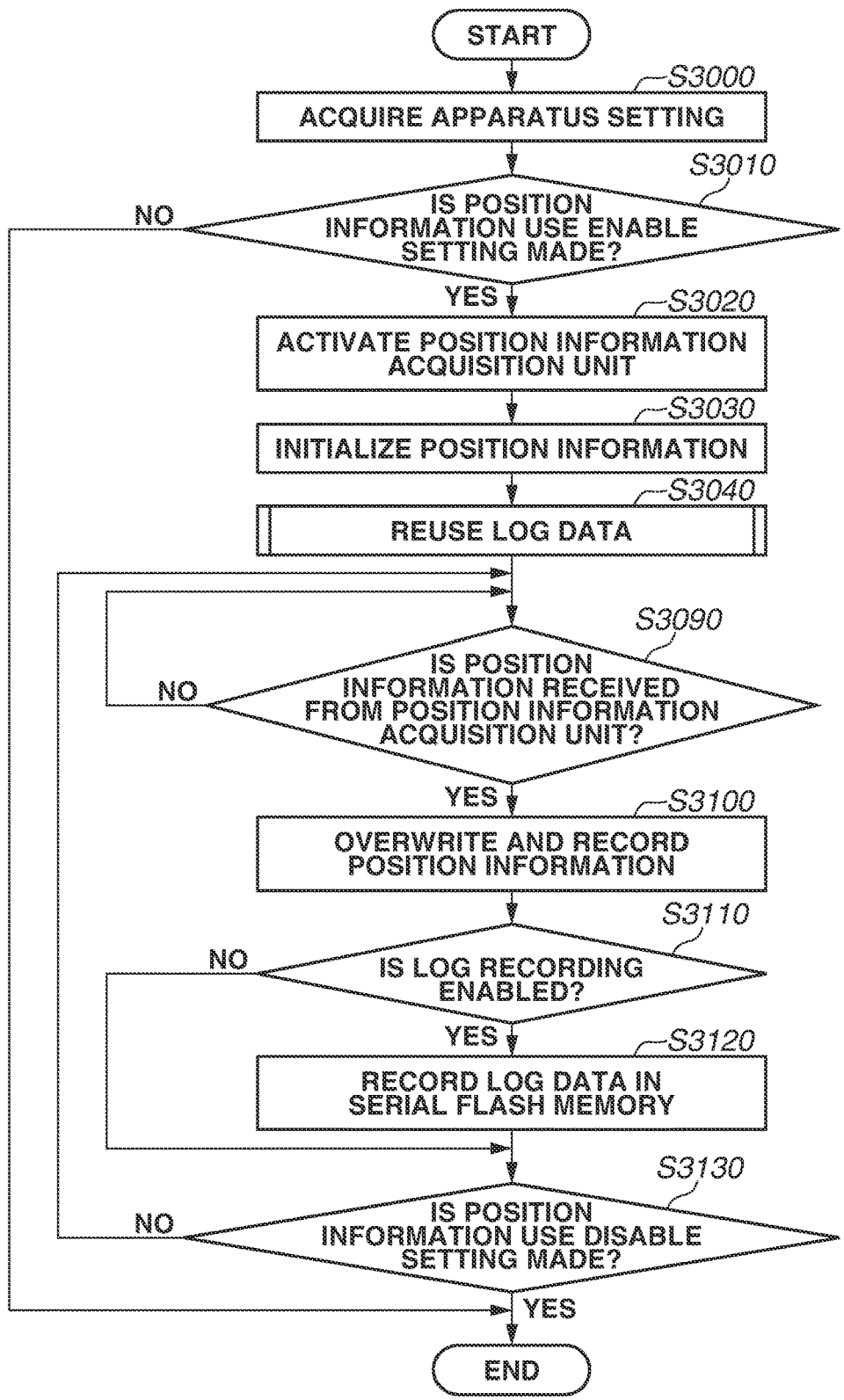

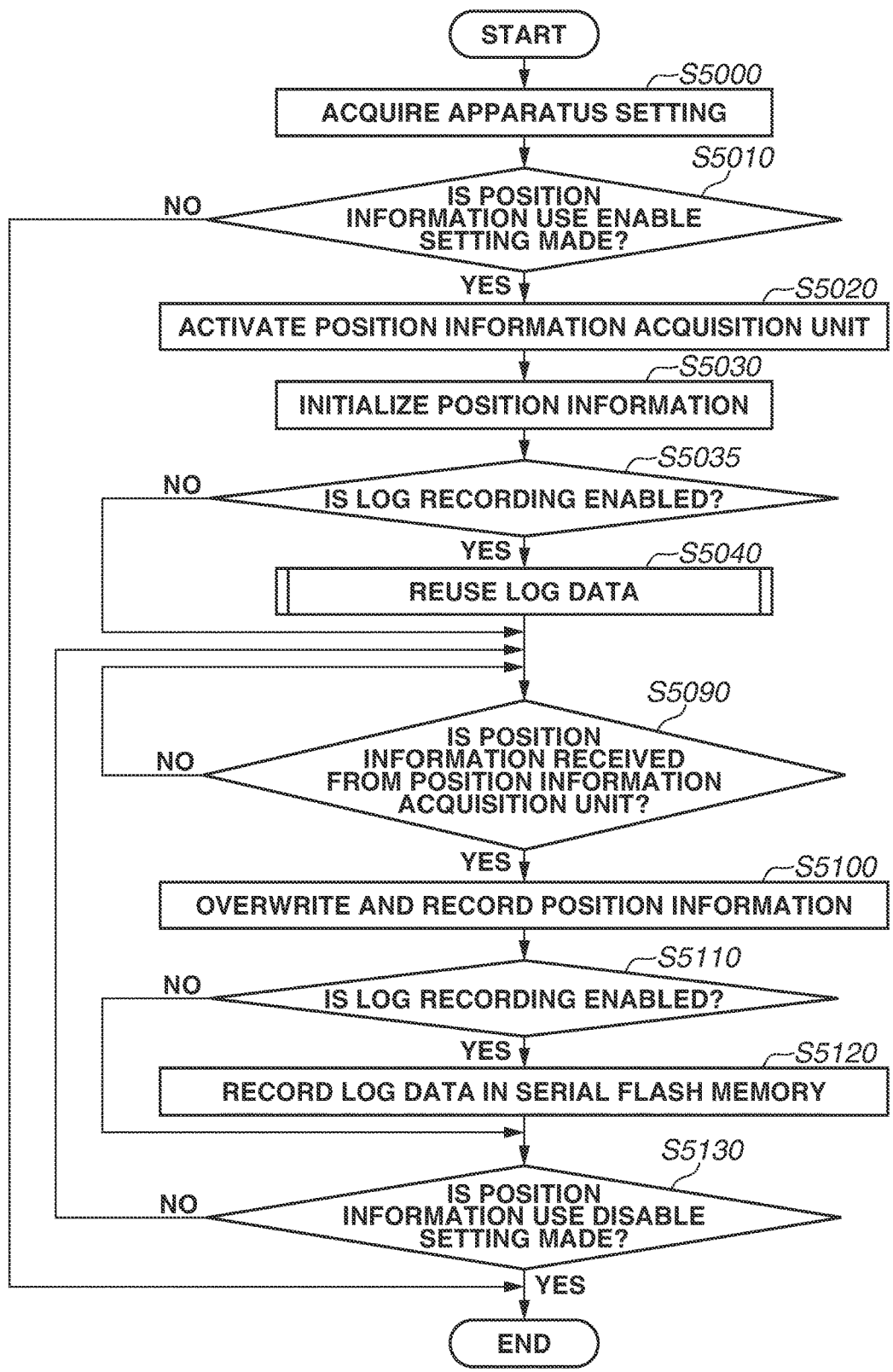

RECORDING APPARATUS, CONTROL METHOD OF RECORDING APPARATUS, AND STORAGE MEDIUM

BACKGROUND OF THE INVENTION

Field of the Invention

The present invention relates to a recording apparatus capable of acquiring and recording position information.

Description of the Related Art

Conventionally, position information has been attached to a captured image through a camera provided with a unit for acquiring position information such as a global positioning system (GPS). For example, Japanese Patent Application Laid-Open No. 2012-105014 discusses a camera having a built-in GPS, which attaches position information acquired through the GPS to an image.

However, in order to calculate a position, a unit such as the GPS for acquiring the position information has to detect a satellite, so that a certain amount of time is necessary to acquire the final position information. Therefore, there is a case where the position information is not attached to the image because calculation of the position information has not yet completed at a timing at which the image is captured. Particularly, when a battery of the camera is replaced, it takes time to acquire the position information because power supplied to a GPS module is discontinued, and thus the GPS has to detect the satellite and execute positioning again.

SUMMARY OF THE INVENTION

According to an aspect of the present invention, a recording apparatus with a battery attachable to and detachable from, includes a positioning unit configured to determine position information based on signals received from satellites, a retaining unit configured to retain the position information determined by the positioning unit, and a control unit, wherein the control unit determines whether latest position information is valid based on an acquisition time of the latest position information from among pieces of the position information retained by the retaining unit and a current time, and uses position information determined as valid as current position information, and wherein the control unit determines whether the latest position information is valid in response to the battery being attached.

Further features of the present invention will become apparent from the following description of exemplary embodiments with reference to the attached drawings.

BRIEF DESCRIPTION OF THE DRAWINGS

FIG. 2 is a conceptual diagram of log data recorded in a serial flash memory of the recording apparatus according to the first exemplary embodiment.

FIG. 3A is a flowchart illustrating operation of the recording apparatus.

FIGS. 5A, 5B, and 5C are flowcharts illustrating operation of a recording apparatus according to a second exemplary embodiment.

DESCRIPTION OF THE EMBODIMENTS

Hereinbelow, exemplary embodiments for embodying the present invention will be described with reference to the appended drawings.

The exemplary embodiments described below are merely examples for realizing the present invention, and may be modified or changed as appropriate according to a configuration or various conditions of the apparatus to which the present invention is applied. Further, each of the exemplary embodiments can be combined as appropriate.

<Camera 1000>

Figure 1:
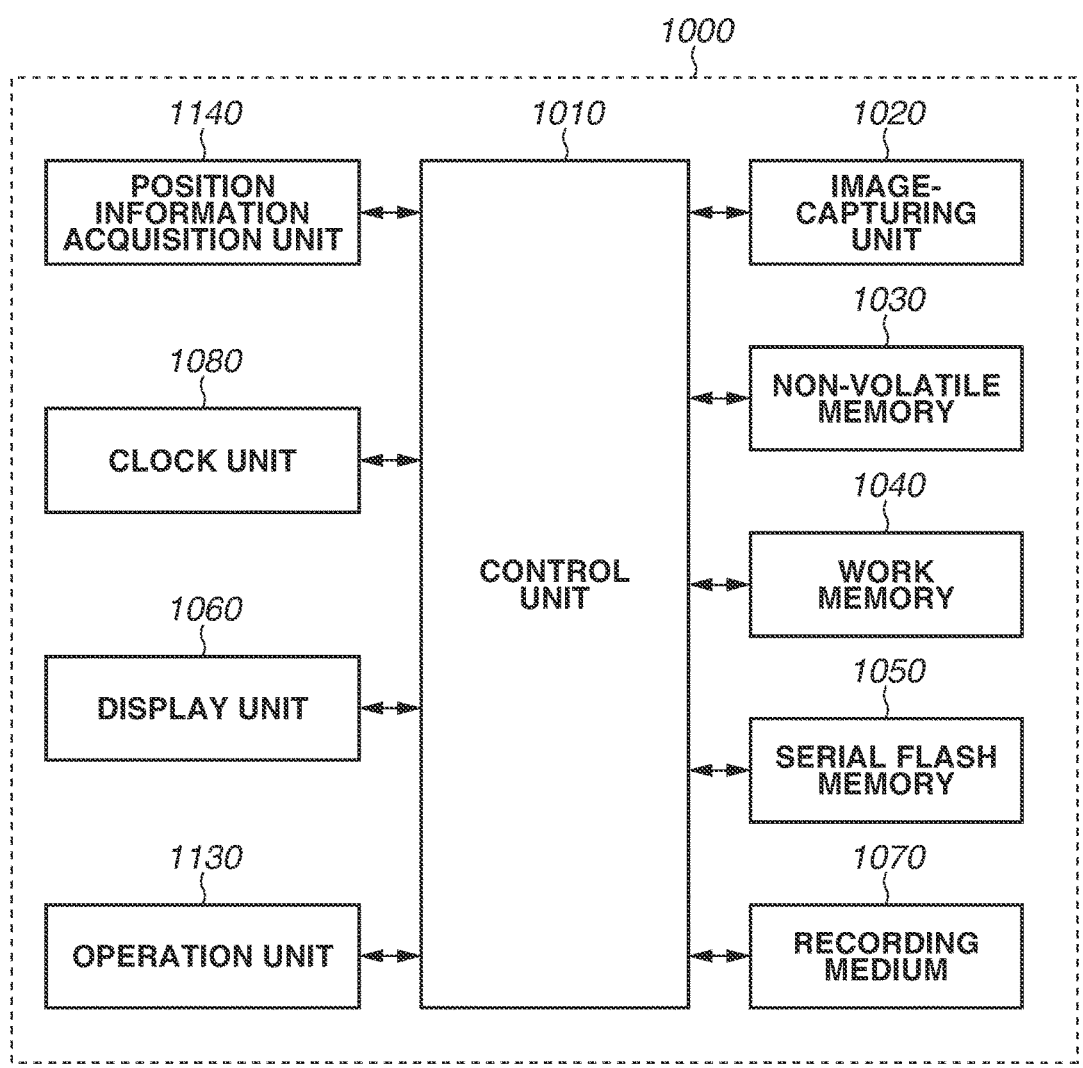
FIG. 1 is a block diagram of a recording apparatus according to a first exemplary embodiment.

FIG. 1 is a block diagram illustrating an example of a configuration of a camera 1000 as an example of a recording apparatus according to a first exemplary embodiment. Although the camera 1000 will be described as an example of the recording apparatus, the recording apparatus is not limited thereto. For example, the recording apparatus may be an information processing apparatus such as a personal computer.

In the present exemplary embodiment, a control unit 1010 controls respective units of the camera 1000. The control unit 1010 controls the respective units of the camera 1000 according to an input signal or a program described below. In addition, a function of the control unit 1010 may be shared by a plurality of pieces of hardware.

An image-capturing unit 1020 converts optical object image (object light image) formed through a lens included in the image-capturing unit 1020 into an electric signal, generates digital data therefrom by executing noise reduction processing, and outputs the digital data as image data. After the captured image data is stored in a buffer memory, a predetermined calculation is executed by the control unit 1010, and the image data is combined with additional information such as exchangeable image file format (Exif) information and recorded in a recording medium 1070.

A non-volatile memory 1030 is an electrically erasable/recordable non-volatile memory for storing a below-described program to be executed by the control unit 1010.

A serial flash memory 1050 stores apparatus settings of the camera 1000 such as image-capturing parameters of the camera 1000 and enable/disable settings of a position information use setting, which are to be stored even after the power of the camera 1000 is turned off. When the position information use enable setting is made, below-described positioning is executed by a position information acquisition unit 1140. Further, the serial flash memory 1050 records position information and date-and-time information acquired from the position information acquisition unit 1140 as log data. The log data is recorded in a part of a recording area in the serial flash memory 1050 provided as a ring buffer. The control unit 1010 records the position information and the date-and-time information provided from the position information acquisition unit 1140 in the serial flash memory 1050 in association with each other.

A work memory 1040 is used as a buffer memory for temporarily storing the image data captured by the image-capturing unit 1020, an image display memory for a display unit 1060, and a work area of the control unit 1010. The work memory 1040 is also used as a buffer memory for temporarily storing the data output from the position information acquisition unit 1140 described below.

The display unit 1060 displays a viewfinder image used when image-capturing operation is performed, captured image data, and characters used for an interactive operation. In addition, the camera 1000 does not have to be provided with the display unit 1060. The camera 1000 may have at least a display control function for executing display control of the display unit 1060 that can connect to the display unit 1060.

The recording medium 1070 can record an image output from the image-capturing unit 1020 and log data read from the serial flash memory 1050. The recording medium 1070 may be configured to be attachable to and detachable from the camera 1000, or built in the camera 1000. In other words, the camera 1000 may have at least means for accessing the recording medium 1070.

An operation unit 1130 is used for receiving an instruction to the camera 1000 from the user. The operation unit 1130 includes operation members such as a power button, a release switch, and a reproduction button which respectively allow the user to provide instructions for turning on and off the power of the camera 1000, capturing an image, and reproducing image data.

The position information acquisition unit 1140 executes positioning processing. The positioning processing refers to processing for receiving signals from global navigation satellite system (GNSS) satellites such as the GPS, and calculating position information indicating a position of the camera 1000 and date-and-time information indicating a received date-and-time of the signal from the received signals. The position information and the date-and-time information calculated by the position information acquisition unit 1140 are provided to the control unit 1010 as necessary.

A clock unit 1080 has a power source independent from a battery of the camera 1000 such as a button cell battery, and outputs the current date-and-time information to the control unit 1010.

<Recording Log Data in Serial Flash Memory>

Next, processing for recording log data in the serial flash memory 1050 in the camera 1000 will be described. The control unit 1010 instructs the position information acquisition unit 1140 to notify the control unit 1010 of the position information and the date-and-time information at a predetermined interval. The control unit 1010 records the position information and the date-and-time information indicating the acquisition date-and-time of the position information received from the position information acquisition unit 1140 in a serial flash memory 1050 as log data in association with each other. Hereinafter, the processing of regularly executing recording of the log data and sequentially and additionally recording a set of the position information and the date-and-time information is referred to as a logging function. Further, data of a state where the position information and the date-and-time information are recorded in the serial flash memory 1050 in association with each other is referred to as log data.

A conceptual diagram of a part of a recording area in the serial flash memory 1050 in which a plurality of pieces of log data is recorded through the logging is illustrated in FIG. 2.

In FIG. 2, a recording area 2000 is a part of the recording area in the serial flash memory 1050. The log data is recorded in a recording area 2020 in the recording area 2000. A conceptual diagram of a data structure of one log data from among a plurality of pieces of log data recorded in the recording area 2020 is illustrated as log data 2200. Date-and-time information 2210 indicating an acquisition date-and-time of the position information is recorded at the head of each log data. This date-and-time information indicates a date-and-time timed in a universal time coordinated (UTC) time axis. Further, pieces of information 2220 to 2260 indicating a latitude and a longitude are recorded as position information. Furthermore, a number of signals (i.e., number of satellites 2270) used for the calculation is also recorded as information indicating accuracy of the position information. This recording area 2020 is provided as a ring buffer. Therefore, the log data is sequentially recorded in the recording area 2020 from a leading end to a trailing end thereof, and the oldest log data is overwritten by a volume of shortage when log data of a volume that exceeds a volume of a free space in the recording area 2020 is to be recorded. In addition, respective pieces of log data are adjusted to have a constant data length. For example, a data length is adjusted by adding an empty data at the end of log data.

A log management record, i.e., information for managing the log data, is recorded in a recording area 2010. The recording area 2010 for recording the log management record is also provided as a ring buffer.

In the camera 1000 of the present exemplary embodiment, when log data recorded in the serial flash memory 1050 is output to the recording medium 1070, log data managed by the log management record is output thereto as one group. A conceptual diagram of one log management record from among a plurality of log management records recorded in the recording area 2010 is illustrated as a log management record 2100. A start date-and-time 2110 indicating a date-and-time of starting the logging is recorded in the log management record 2100. The date-and-time information 2210, which is located at the top of the log data 2200 corresponding to the log management record 2100, is used as the start date-and-time 2110. Further, a UTC time difference 2120 is also recorded in the log management record 2100. The UTC time difference 2120 is time difference information indicating a time difference between the UTC and the current time (local standard time). A user previously sets the information about the UTC time difference 2120 as the apparatus setting of the camera 1000 by operating a menu to select a time zone corresponding to the current position. Alternatively, the UTC time difference 2120 may be calculated by determining a time zone based on the position information acquired from the position information acquisition unit 1140. Further, each log management record 2100 includes a recording start address 2130 and a data size 2140 of corresponding log data 2200, so that a group of pieces of corresponding log data 2200 is determined based on the above pieces of information 2130 and 2140. More specifically, as described above, because a data length of the log data 2200 is constant, and the log data 2200 is sequentially recorded in the recording area 2020, a group of pieces of log data 2200 corresponding to the log management record 2100 can be determined by counting a data amount by a value indicated by the data size 2140 from the recording start address 2130. In this way, a plurality of pieces of log data 2200 sequentially recorded in the recording area 2020 is divided into and managed as a specific group. With respect to the latest log management record 2100 in a logging state, the number of corresponding log data 2200 is increasing continuously. In other words, the data size 2140 of the log data 2200 finally managed by that log management record 2100 has not yet determined. Therefore, the data size 2140 of the latest log management record 2100 in a logging state has not been recorded. The data size 2140 of the log management record 2100 is recorded at a timing at which the date is changed through passage of time or user operation, or a time zone setting (i.e., UTC time difference 2120) is changed through user operation or movement of the camera 1000. In other words, the log management record 2100 is recorded so as to be a different record at each date-and-time or each UTC time difference 2120.

<Positioning Processing Executed by Position Information Acquisition Unit 1140>

Next, the position information acquisition unit 1140 will be described.

The position information acquisition unit 1140 is configured of an antenna for receiving a radio wave of the GNSS satellite, a microcomputer for analyzing received data, a non-volatile memory for storing a control program of the microcomputer, a working storage area, and a non-volatile memory for storing satellite orbit information, which are not illustrated.

In the positioning processing through the GNSS, a position of own apparatus is acquired by calculating precise positions of three or more satellites and a precise distance between each of the satellites and the own apparatus. First, in order to figure out the satellites existing at positions usable for positioning, the position information acquisition unit 1140 receives approximate entire satellite orbit information (i.e., almanac data in GPS) broadcasted by the satellites and stores the received information in the non-volatile memory. In addition, a satellite existing at a position usable for positioning refers to a satellite that exists at a position where a signal transmitted therefrom can be received on the ground where the camera 1000 exists from among a plurality of satellites orbiting around the earth.

Next, in order to figure out a precise orbit of the satellite (i.e., position at each time), the position information acquisition unit 1140 acquires precise orbit information of the satellite (i.e., ephemeris data in GPS) broadcasted by the satellite which may be used for positioning. A distance between the satellite and own apparatus can be acquired from the precise orbit information of the satellite and a difference between time information at which the data is transmitted from the satellite and a time at which the data is received by the position information acquisition unit 1140. As described above, the position information acquisition unit 1140 acquires the position of own apparatus by calculating precise positions of three or more satellites and a distance between each of the satellites and own apparatus.

Approximate satellite orbit information can be acquired for a period of several months, and precise satellite orbit information of each satellite can be acquired for a period of several hours, and each of the above periods is a validity period in which each satellite can be used for positioning. Because these pieces of satellite orbit information are broadcasted from the satellites, the position information acquisition unit 1140 stores the received satellite orbit information in the non-volatile memory, and updates the satellite orbit information in the non-volatile memory by receiving new satellite orbit information before a validity period of the stored satellite orbit information is expired. Therefore, if valid satellite orbit information is not stored in the non-volatile memory, it takes several minutes to calculate the position information of own apparatus even if a radio wave condition of the satellite is satisfactory. Further, even if the valid satellite orbit information is stored in the non-volatile memory, it takes several tens of seconds to several minutes to output the position information of own apparatus by calculating the precise position information of the satellite used for positioning.

<Log Data Reuse Processing>

As described above, it takes time for the control unit 1010 to acquire the position information after activating the position information acquisition unit 1140. Further, even if positioning has been executed by detecting the satellite, the position information acquisition unit 1140 is reactivated when the battery of the camera 1000 is replaced, and thus it will take several tens of seconds to notify the position information again. If an image is captured during this period, there arises a problem during which the position information is not attached to the image. Therefore, in the present exemplary embodiment, a period during which the position information is not attached is shortened through the processing illustrated in a flowchart in FIG. 3A.

FIG. 3A is a flowchart illustrating processing to be executed when a user replaces a battery of the camera 1000 in which position information has just been used by storing a setting for attaching the position information to the image in the serial flash memory 1050. In other words, the flowchart in FIG. 3A is executed when the battery is attached.

First, the control unit 1010 is activated when the battery is attached. Then, in step S3000, the control unit 1010 acquires an apparatus setting stored in the serial flash memory 1050 and stores the apparatus setting in the work memory 1040.

Next, in step S3010, the control unit 1010 judges whether a position information use enable setting is made. If the position information use enable setting is made (YES in step S3010), the processing proceeds to step S3020. If the position information use enable setting is not made (NO in step S3010), the processing is ended. In step S3020, the control unit 1010 activates the position information acquisition unit 1140, and in step S3030, the control unit 1010 initializes the position information to be attached to the image.

Then, if position information acquired within a validity period is recorded in the log data recorded in the serial flash memory 1050, in step S3040, the control unit 1010 acquires temporarily valid position information by executing a log data reuse subroutine described below. If image-capturing operation is performed in this state, the position information reused from the log data is attached to the image.

Thereafter, in step S3090, if the position information acquisition unit 1140 acquires a positioning solution from the GNSS satellite and outputs valid position information to the control unit 1010 (YES in step S3090), the processing proceeds to step S3100. If the control unit 1010 does not receive the valid position information from the position information acquisition unit 1140 (NO in step S3090), the control unit 1010 waits until the valid position information is received. In step S3100, the control unit 1010 overwrites and records the position information in the work memory 1040 and updates the current position information of the camera 1000. The position information acquired from the position information acquisition unit 1140 is attached to the image if the user performs image-capturing operation thereafter.

Further, if setting that enables log recording is made in the apparatus setting of the camera 1000 (YES in step S3110), the processing proceeds to step S3120. If setting that enables log recording is not made (NO in step S3110), the processing proceeds to step S3130. In step S3120, the control unit 1010 records the position information acquired from the position information acquisition unit 1140 and the acquisition date-and-time of the position information in the serial flash memory 1050.

If valid position information cannot be acquired from the position information acquisition unit 1140 even if a predetermined validity period has passed after the control unit 1010 has recorded the last position information in the work memory 1040, the control unit 1010 invalidates the position information in the work memory 1040. Thereafter, until the valid position information is acquired from the position information acquisition unit 1140 next time, the valid position information will not be attached to the image file even if the user performs image-capturing operation.

In step S3130, if the position information use disable setting is not made in the apparatus setting of the camera 1000 (NO in step S3130), the processing returns to step S3090, and the control unit 1010 waits until valid position information is received from the position information acquisition unit 1140. If the position information use disable setting is made (YES in step S3130), the processing is ended.

Next, the log data reuse subroutine described in step S3040 of FIG. 3A will be described with reference to FIG. 3B.

In step S3500, if at least a piece of log data is recorded in the serial flash memory 1050 (YES in step S3500), the processing proceeds to step S3510. In step S3510, the control unit 1010 reads the latest log data recorded in the serial flash memory 1050 and records it in the work memory 1040. Next, in step S3520, the control unit 1010 acquires a current date-and-time from the clock unit 1080. In step S3530, if the acquisition time of the latest log data falls within a predetermined validity period of the position information (YES in step S3530), the processing proceeds to step S3540. If the acquisition time does not fall within the validity period (NO in step S3530), the processing returns to step S3500. In step S3540, the control unit 1010 records the position information of the log data in the work memory 1040 as the current valid position information of the camera 1000. Thereafter, when an image-capturing operation is performed by the user, the control unit 1010 attaches the position information recorded in the work memory 1040 to the image data to create an image file. In addition, if none of the log data is recorded in the serial flash memory 1050 (NO in step S3500), the position information has an invalid value until the control unit 1010 acquires position information from the position information acquisition unit 1140.

Next, an operation of the control unit 1010 when the user performs image-capturing operation will be described with reference to a flowchart in FIG. 3C.

First, in step S3200, the control unit 1010 requests the image-capturing unit 1020 to execute an image-capturing operation and acquires image data. In step S3210, if the position information use enable setting is made in the apparatus setting of the camera 1000 (YES in step S3210), the processing proceeds to step S3230. If the position information use enable setting is not made (NO in step S3210), the processing proceeds to step S3240. In step S3230, the control unit 1010 records the position information in the work memory 1040 in a GPS tag of Exif information of the image data. Thereafter, in step S3240, the control unit 1010 records the image data in the recording medium 1070 as a file. In other words, if the position information in the work memory 1040 is valid position information, the valid position information is attached to the image while the invalid position information is attached to the image if the position information is invalid or initialized.

Figure 3B:
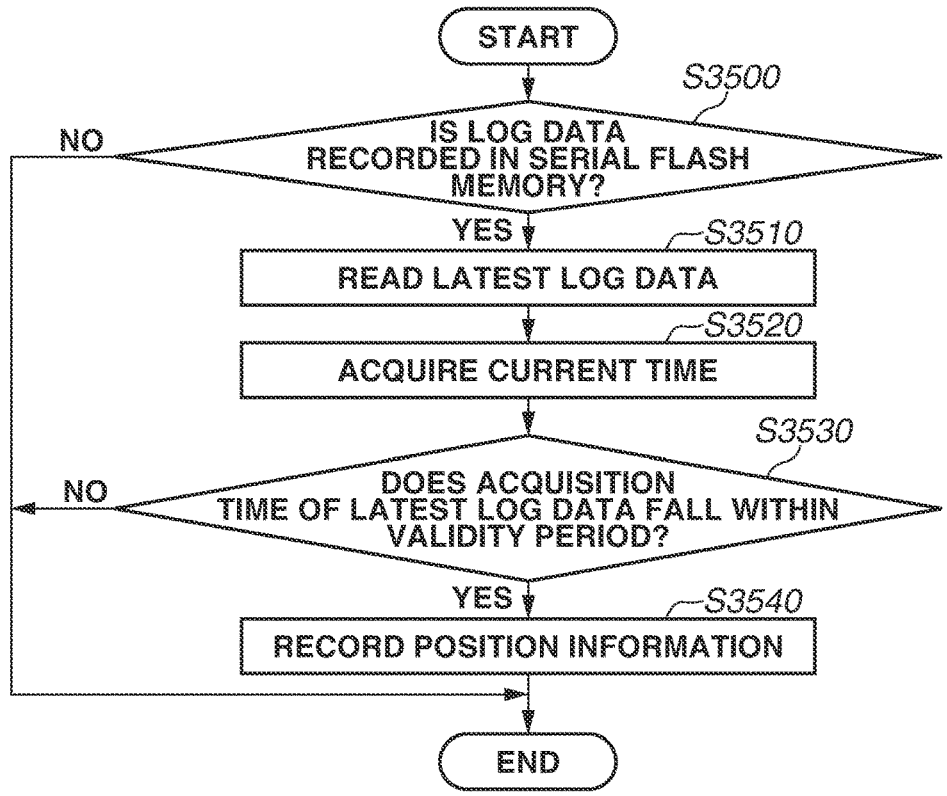
FIG. 3B is a flowchart illustrating log data reuse processing of the recording apparatus.
Figure 3C:
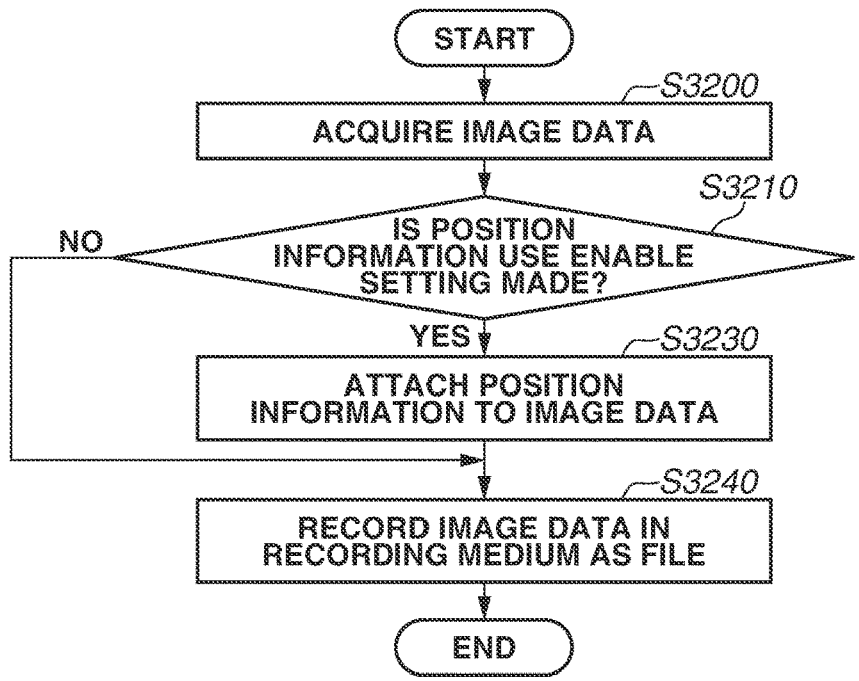
FIG. 3C is a flowchart illustrating image-capturing operation of the recording apparatus.
Figure 3D:
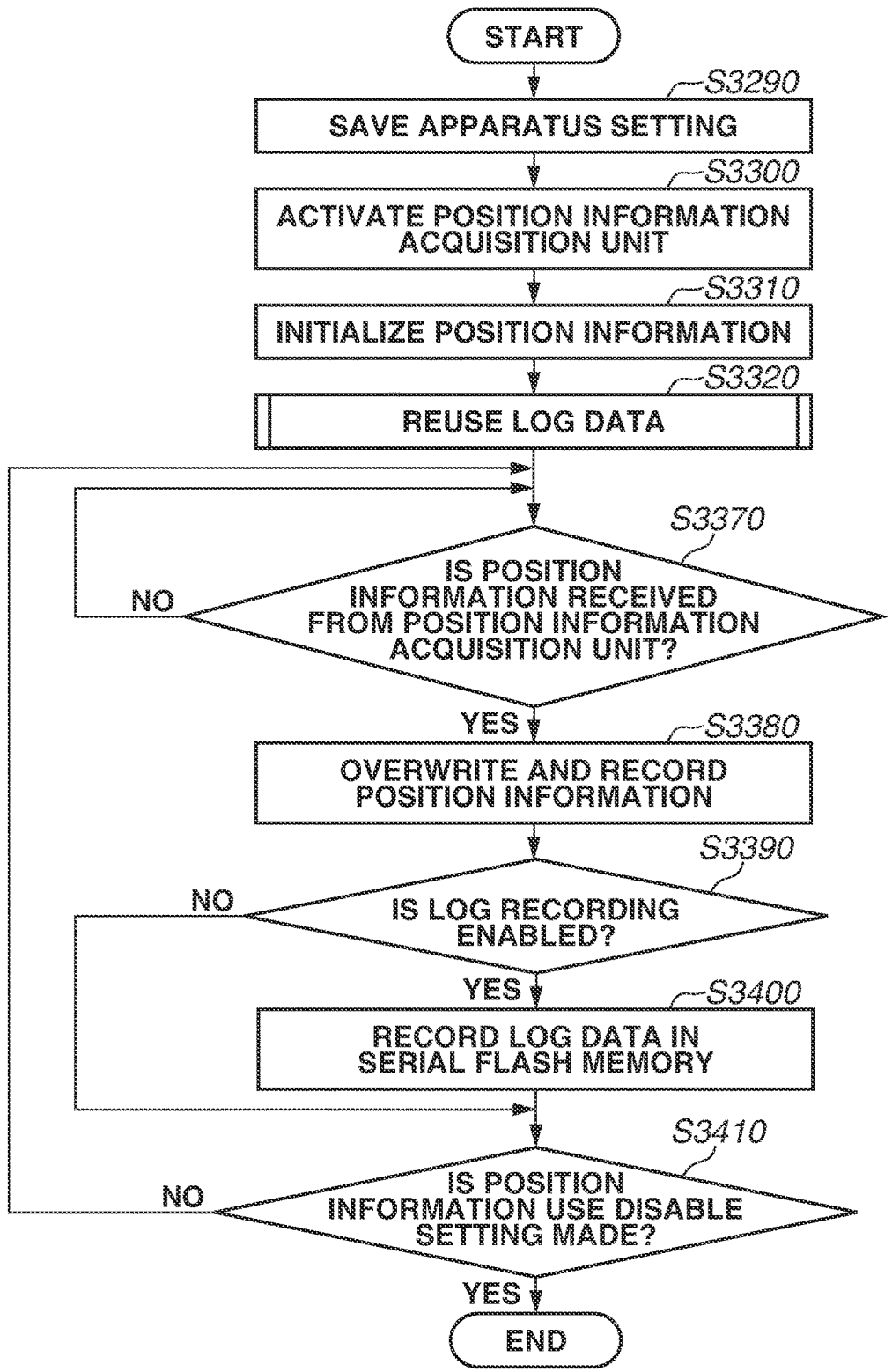
FIG. 3D is a flowchart illustrating operation of the recording apparatus, according to the first exemplary embodiment.

FIG. 3D is a flowchart illustrating processing to be executed in a case where an instruction for changing the position information use enable setting is received from the user when the position information use disable setting is made in the apparatus setting of the camera 1000.

Upon receiving the instruction from the user, in step S3290, the control unit 1010 changes a state of the position information use setting in the work memory 1040 from a disabled state to an enabled state, and saves the changed apparatus setting of the camera 1000 in the serial flash memory 1050.

Next, in step S3300, the control unit 1010 activates the position information acquisition unit 1140. Then, in step S3310, the control unit 1010 initializes the position information in the work memory 1040.

At this time if the position information acquired within the validity period is included in the log data recorded in the serial flash memory 1050, in step S3320, the control unit 1010 executes the log data reuse subroutine and acquires temporarily valid position information. If an image-capturing operation is performed in this state, the position information reused from the log data is attached to the image.

Thereafter, in step S3370, if the position information acquisition unit 1140 acquires a positioning solution from the GNSS satellite and outputs valid position information to the control unit 1010 (YES in step S3370), the processing proceeds to step S3380. If the control unit 1010 does not receive the valid position information from the position information acquisition unit 1140 (NO in step S3370), the control unit 1010 waits until the valid position information is received. In step S3380, the control unit 1010 overwrites and records the position information in the work memory 1040, and updates the current position information of the camera 1000. The position information acquired from the position information acquisition unit 1140 is attached to the image if the user performs an image-capturing operation thereafter.

Further, if setting that enables log recording is made in the apparatus setting of the camera 1000 (YES in step S3390), the processing proceeds to step S3400. If setting that enables log recording is not made (NO in step S3390), the processing proceeds to step S3410. In step S3400, the control unit 1010 records the position information acquired from the position information acquisition unit 1140 and the acquisition date-and-time of the position information in the serial flash memory 1050.

If valid position information cannot be acquired from the position information acquisition unit 1140 even if a predetermined validity period has passed after the control unit 1010 has recorded the last position information in the work memory 1040, the control unit 1010 invalidates the position information in the work memory 1040. Thereafter, until valid position information is acquired from the position information acquisition unit 1140 next time, valid position information will not be attached to the image file even if the user performs an image-capturing operation.

In step S3410, if the position information use disable setting is not made in the apparatus setting of the camera 1000 (NO in step S3410), the processing returns to step S3370, and control unit 1010 waits until valid position information is received from the position information acquisition unit 1140. If the position information use disable setting is made (YES in step S3410), the processing is ended. As described above, when the position information use enable setting is made from a disabled state in the apparatus setting of the camera 1000, processing similar to the processing executed when the battery of the camera 1000 is attached in the enabled state of the position information use setting will be executed.

As described above, even if valid position information is not output from the position information acquisition unit 1140 immediately after replacing the battery, the position information can be attached to the captured image by reusing the log data.

Further, in the present exemplary embodiment, although the position information within a validity period is reused by using the latest log data because the camera 1000 has a logger function for recording an orbit as the log data, it is not limited thereto. For example, information consisting of position information and only one acquisition date-and-time of the position information may be recorded in the non-volatile memory, and that information may be reused. In this case, the position information retained in the non-volatile memory may be updated every time valid position information is output from the position information acquisition unit 1140.

In a second exemplary embodiment, a camera that enables a user to select and change a validity period of position information will be described as an example. Further, in the camera according to the present exemplary embodiment, the log data in the serial flash memory 1050 is accessible only when log recording is enabled in the logger function.

Figure 4A:
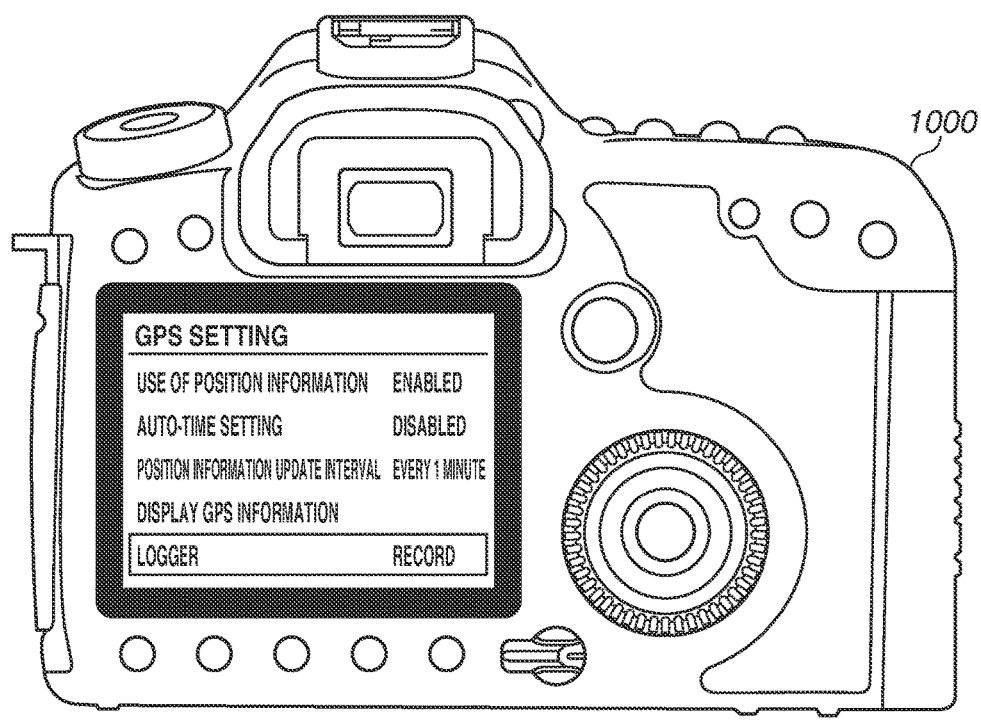
FIGS. 4A, 4B, and 4C are diagrams illustrating examples of a user interface displayed by the recording apparatus according to the first exemplary embodiment.
Figure 4B:
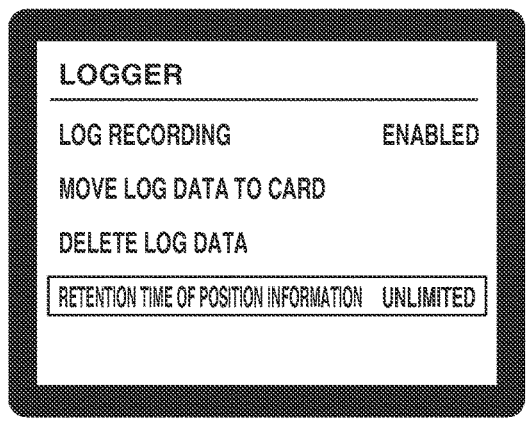
Figure 4C:
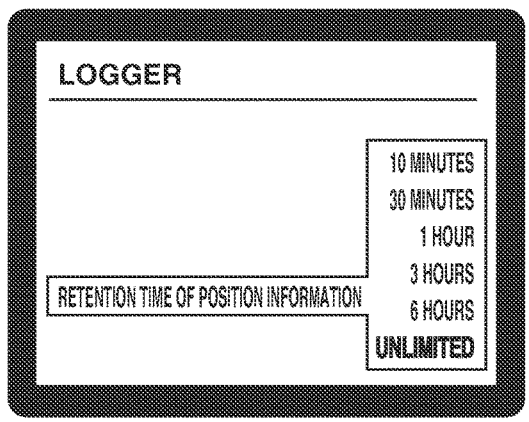

FIGS. 4A to 4C are diagrams illustrating a user interface that allows a user to select or change a time period for retaining the acquired position information in the work memory 1040. In other words, this user interface allows the user to select or change a validity period in which position information acquired from the position information acquisition unit 1140 is regarded as the current position information of the camera.

FIG. 4A is a diagram illustrating a state where a menu for the position information use setting is displayed on a liquid crystal display screen mounted on a back face of the camera 1000. In a screen in FIG. 4A, when the user selects and confirms "logger" through the operation unit 1130, the screen is shifted to a screen in FIG. 4B. When the user selects and confirms "retention time of position information" in the logger setting screen in FIG. 4B through the operation unit 1130, the screen is shifted to a screen in FIG. 4C. When the user selects and confirms a desired time from options of the retention time of the position information, a validity period of the position information in the apparatus setting of the camera 1000 can be changed.

Further, in a case where the apparatus setting of the camera 1000 is changed, the control unit 1010 changes the apparatus setting in the work memory 1040 and records that apparatus setting in the serial flash memory 1050, so that the apparatus setting of the camera 1000 can be restored even if the power is turned off or the battery is removed and attached.

Next, an operation of the camera 1000 according to the present exemplary embodiment will be described.

FIG. 5A is a flowchart illustrating processing to be executed when a user replaces a battery of the camera 1000 that has stored a setting for attaching the position information to the image in the serial flash memory 1050 and has been using position information.

The processing described in steps S3000 to S3030 illustrated in FIG. 3A is executed in steps S5000 to S5030. Then, in step S5035, if setting for enabling recording log data of the position information is made (YES in step S5035), the processing proceeds to step S5040. In step S5040, the control unit 1010 executes a log data reuse subroutine. The processing illustrated in FIG. 3B is executed as the log data reuse subroutine. If image-capturing operation is performed in the above state, the position information reused from the log data is attached to the image.

On the other hand, if setting for enabling recording log data of the position information is not made (NO in step S5035), there is a high possibility that valid log data is not recorded. Therefore, in this case, the control unit 1010 waits until the position information is acquired from the position information acquisition unit 1140 without accessing the log data. In this case, the position information cannot be attached to the image even if image-capturing operation is performed.

Thereafter, in step S5090, if the position information acquisition unit 1140 acquires a positioning solution from the GNSS satellite and outputs valid position information to the control unit 1010 (YES in step S5090), the processing proceeds to step S5100. If the control unit 1010 does not receive the valid position information from the position information acquisition unit 1140 (NO in step S5090), the control unit 1010 waits until the valid position information is received. In step S5100, the control unit 1010 overwrites and records the position information in the work memory 1040, and updates the current position information of the camera 1000. The position information acquired from the position information acquisition unit 1140 is attached to the image if the user performs an image-capturing operation thereafter.

Processing similar to the processing illustrated in steps S3110 to S3130 in FIG. 3A is executed in steps S5110 to S5130.

Figure 5B:
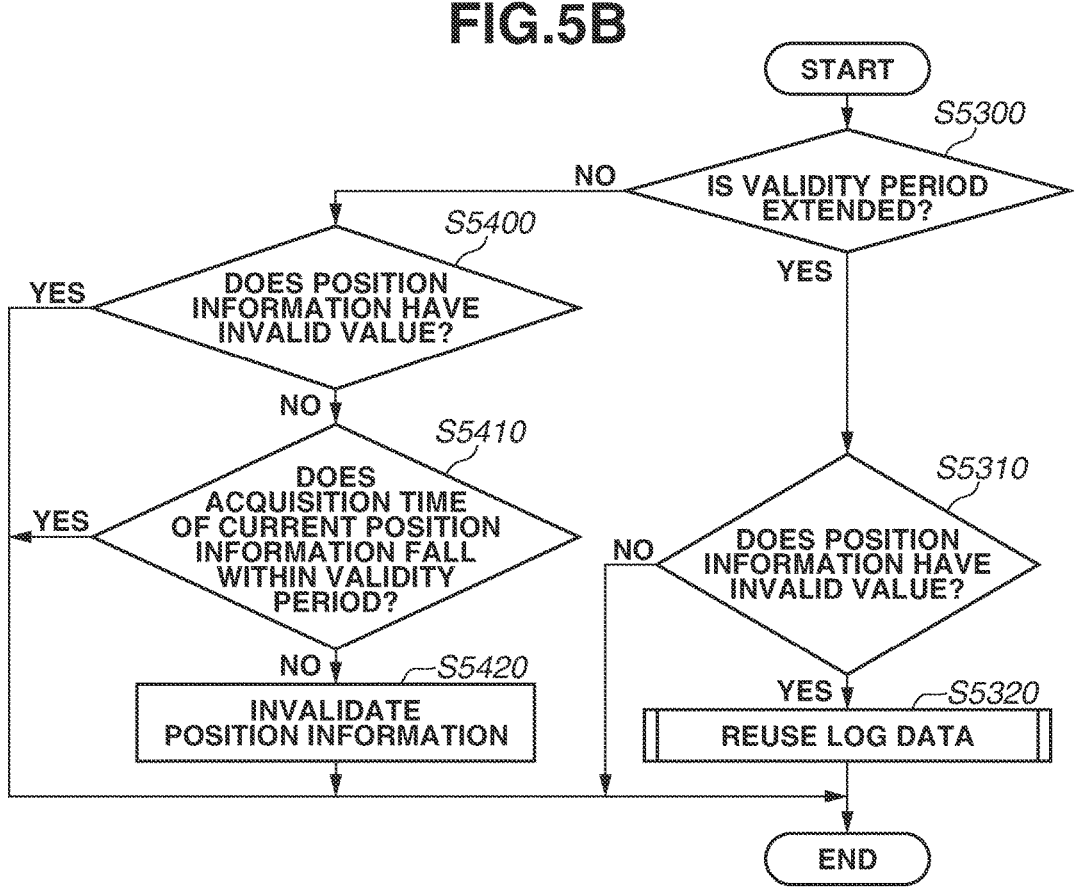

FIG. 5B is a flowchart illustrating processing to be executed when an instruction for changing the validity period of the position information is received from the user.

First, in step S5300, if an instruction for extending the validity period of the position information is received (YES in step S5300), the processing proceeds to step S5310. In step S5310, if the position information recorded in the work memory 1040 has an invalid value (YES in step S5310), the processing proceeds to step S5320. If the position information recorded in the work memory 1040 has a valid value (NO in step S5310), the processing is ended. In step S5320, the control unit 1010 executes the log data reuse subroutine.

Further, if the validity period of the position information is changed to a period shorter than the previous validity period (NO in step S5300), the processing proceeds to step S5400. Then, in step S5400, if valid position information is recorded in the work memory 1040 (NO in step S5400), the processing proceeds to step S5410. If the position information recorded in the work memory 1040 has an invalid value (YES in step S5400), the processing is ended. In step S5410, the control unit 1010 checks whether the acquisition date-and-time of the position information falls within the new validity period. If the acquisition date-and-time of the position information falls within the validity period (YES in step S5410), the processing is ended. If the acquisition date-and-time passes the validity period (NO in step S5410), the processing proceeds to step S5420. In step S5420, the control unit 1010 invalidates the position information in the work memory 1040. Thereafter, until valid position information is acquired from the position information acquisition unit 1140, valid position information will not be attached to the captured image. In addition, the processing in steps S5090 to S5120 in FIG. 5A may be executed after the processing in step S5320.

Figure 5C:
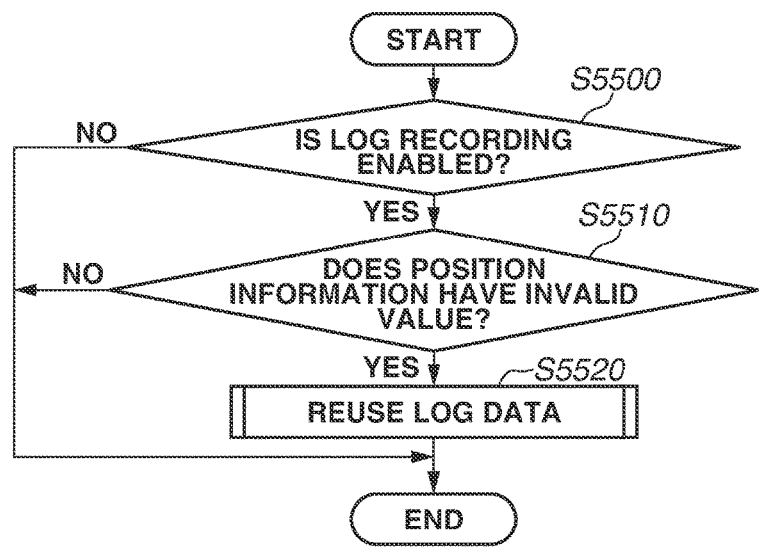

FIG. 5C is a flowchart illustrating processing to be executed when setting of log recording is changed by the user. In the camera 1000 of the present exemplary embodiment, when setting that enables log recording is made, log data is reused if valid position information is not recorded.

First, in step S5500, the control unit 1010 judges whether an instruction for changing a setting that enables log recording is set is received. If the control unit 1010 judges that the instruction for changing a setting that enables log recording is received (YES in step S5500), the processing proceeds to step S5510. If the control unit 1010 judges that the instruction for changing a setting that enables log recording is not received (NO in step S5500), the processing is ended.

In step S5510, the control unit 1010 judges whether the position information recorded in the work memory 1040 has an invalid value. If the control unit 1010 judges that the position information recorded in the work memory 1040 has an invalid value (YES in step S5510), the processing proceeds to step S5520. If the control unit 1010 judges that the position information recorded in the work memory 1040 does not have an invalid value (NO in step S5510), the processing is ended. In step S5520, the control unit 1010 executes the log data reuse subroutine illustrated in FIG. 3B, and acquires temporarily valid position information. If an image-capturing operation is performed in the above state, the position information reused from the log data is attached to the image. In addition, the processing in steps S5090 to S5120 in FIG. 5A may be executed after the processing in step S5220.

As described above, in the camera 1000 according to the present exemplary embodiment, log data is referred to when the user changes the setting that enables log recording, and position information can be reused if the acquisition date-and-time thereof falls within the validity period.

Further, in the camera 1000 according to the present exemplary embodiment, a validity period can be changed according to the instruction from the user. With this configuration, for example, even in a case where a user started an image-capturing operation outside in a state where the user can acquire position information cannot acquire the position information when the user moves inside, the user can reuse the position information acquired previously by extending the validity period.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-096259, filed May 12, 2016, which is hereby incorporated by reference herein in its entirety.

What is claimed is:

1. A recording apparatus configured to receive a battery and release the battery from the recording apparatus, the recording apparatus comprising:
   a positioning unit configured to determine position information based on signals received from satellites;
   a retaining unit configured to retain the position information determined by the positioning unit;
   an image-capturing unit configured to capture an object image to generate image data; and
   a control unit configured to execute control,
   wherein, in a case where the positioning unit determines latest position information and in response to receiving the battery as attached, the control unit executes control to determine whether the latest position information is valid based on an acquisition time of the latest position information from among pieces of the position information retained by the retaining unit and a current time, and uses position information determined as valid as current position information, and
   wherein, in a case where image data is generated by the image-capturing unit, the control unit executes control to attach position information used as the current position information to the generated image data.

2. The recording apparatus according to claim 1 further comprising an operation unit,
   wherein the control unit is configured to receive an instruction for specifying a validity period of the position information from a user via the operation unit.

3. The recording apparatus according to claim 2,
   wherein the control unit is configured to receive a use setting of the positioning unit, and
   wherein, in response to the validity period being extended by the user in a state where the positioning unit is set to be usable, the control unit executes control to determine whether the latest position information is valid.

4. The recording apparatus according to claim 2,
   wherein the positioning unit is configured to receive satellite orbit information, and
   wherein a validity period, different from the validity period of the position information, is set to the satellite orbit information.

5. The recording apparatus according to claim 1,
   wherein the control unit is configured to receive a setting of whether to enable a logging function for periodically recording position information together with time information, and
   wherein, in a case where the logging function is not enabled, the control unit executes control to not execute determination of whether the latest position information is valid, even if the battery is attached to the recording apparatus.

6. The recording apparatus according to claim 1, wherein, in a case where position information is newly determined by the positioning unit, the control unit executes control to use newly determined position information as current position information instead of the position information retained by the retaining unit.

7. A method for a recording apparatus configured to receive a battery and release the battery from the recording apparatus, the method comprising:
   determining position information based on signals received from satellites;
   retaining the determined position information;
   capturing an object image to generate image data; and
   executing control,
   wherein, in a case where latest position information is determined and in response to receiving the battery as attached, executing control includes determining whether the latest position information is valid based on an acquisition time of the latest position information from among retained pieces of the position information and a current time, and using position information determined as valid as current position information, and
   wherein, in a case where image data is generated by the recording apparatus, executing control includes attaching position information used as the current position information to the generated image data.

8. A non-transitory computer-readable storage medium storing a program to cause a recording apparatus, configured to receive a battery and release the battery from the recording apparatus, to perform a method, the method comprising:
   determining position information based on signals received from satellites;
   retaining the determined position information;
   capturing an object image to generate image data; and
   executing control,
   wherein, in a case where latest position information is determined and in response to receiving the battery as attached, executing control includes determining whether the latest position information is valid based on an acquisition time of the latest position information from among retained pieces of the position information and a current time, and using position information determined as valid as current position information, and
   wherein, in a case where image data is generated by the recording apparatus, executing control includes attaching position information used as the current position information to the generated image data.

9. A recording apparatus configured to receive a battery and release the battery from the recording apparatus, the recording apparatus comprising:
   a positioning unit configured to determine position information based on a predetermined resource;
   a retaining unit configured to retain the position information determined by the positioning unit;
   an image-capturing unit configured to capture an object image to generate image data; and
   a control unit configured to execute control,
   wherein, in a case where the positioning unit determines latest position information and in response to receiving the battery as attached, the control unit executes control to determine whether the latest position information is valid based on an acquisition time of the latest position information from among pieces of the position information retained by the retaining unit and a current time, and uses position information determined as valid as current position information, and
   wherein, in a case where image data is generated by the image-capturing unit, the control unit executes control to attach position information used as the current position information to the generated image data.

10. The recording apparatus according to claim 9 further comprising an operation unit,
    wherein the control unit is configured to receive an instruction for specifying a validity period of the position information from a user via the operation unit.

11. The recording apparatus according to claim 10,
    wherein the control unit is configured to receive a use setting of the positioning unit, and
    wherein, in response to the validity period being extended by the user in a state where the positioning unit is set to be usable, the control unit executes control to determine whether the latest position information is valid.

12. The recording apparatus according to claim 10,
    wherein the positioning unit is configured to receive satellite orbit information, and
    wherein a validity period, different from the validity period of the position information, is set to the satellite orbit information.

13. The recording apparatus according to claim 9,
    wherein the control unit is configured to receive a setting of whether to enable a logging function for periodically recording position information together with time information, and
    wherein, in a case where the logging function is not enabled, the control unit executes control to not execute determination of whether the latest position information is valid, even if the battery is attached to the recording apparatus.

14. The recording apparatus according to claim 9, wherein, in a case where position information is newly determined by the positioning unit, the control unit executes control to use newly determined position information as current position information instead of the position information retained by the retaining unit.

15. A method for a recording apparatus configured to receive a battery and release the battery from the recording apparatus, the method comprising:
    determining position information based on a predetermined resource;
    retaining the determined position information;
    capturing an object image to generate image data; and
    executing control,
    wherein, in a case where latest position information is determined and in response to receiving the battery as attached, executing control includes determining whether the latest position information is valid based on an acquisition time of the latest position information from among retained pieces of the position information and a current time, and using position information determined as valid as current position information, and
    wherein, in a case where image data is generated by the recording apparatus, executing control includes attaching position information used as the current position information to the generated image data.

16. A non-transitory computer-readable storage medium storing a program to cause a recording apparatus, configured to receive a battery and release the battery from the recording apparatus, to perform a method, the method comprising:
    determining position information based on a predetermined resource;
    retaining the determined position information;
    capturing an object image to generate image data; and
    executing control, wherein, in a case where latest position information is determined and in response to receiving the battery as attached, executing control includes determining whether the latest position information is valid based on an acquisition time of the latest position information from among retained pieces of the position information and a current time, and using position information determined as valid as current position information, and wherein, in a case where image data is generated by the recording apparatus, executing control includes attaching position information used as the current position information to the generated image data.

* * * * *